Figure 1:
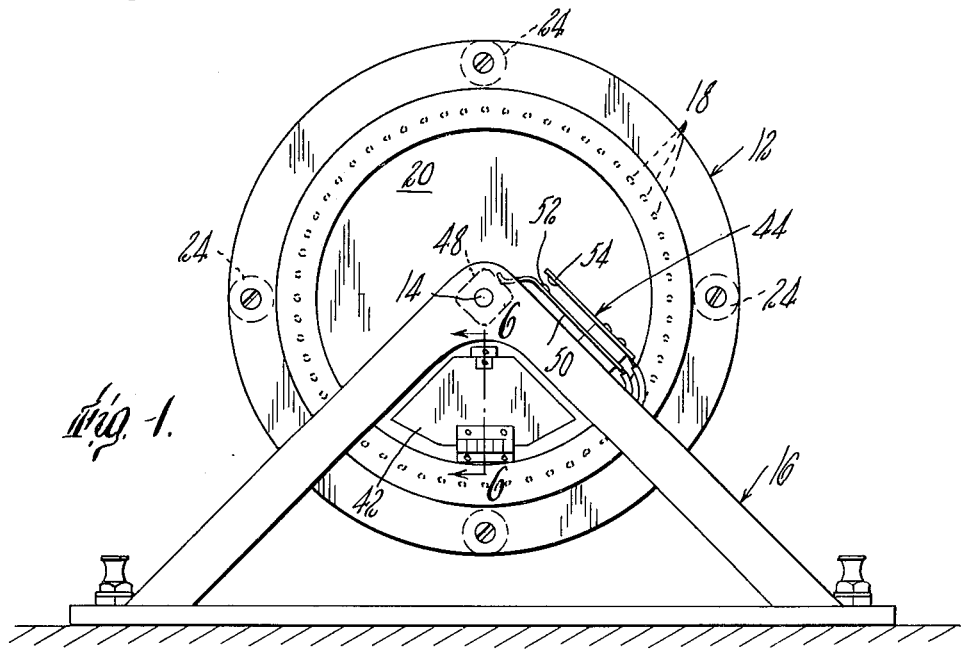

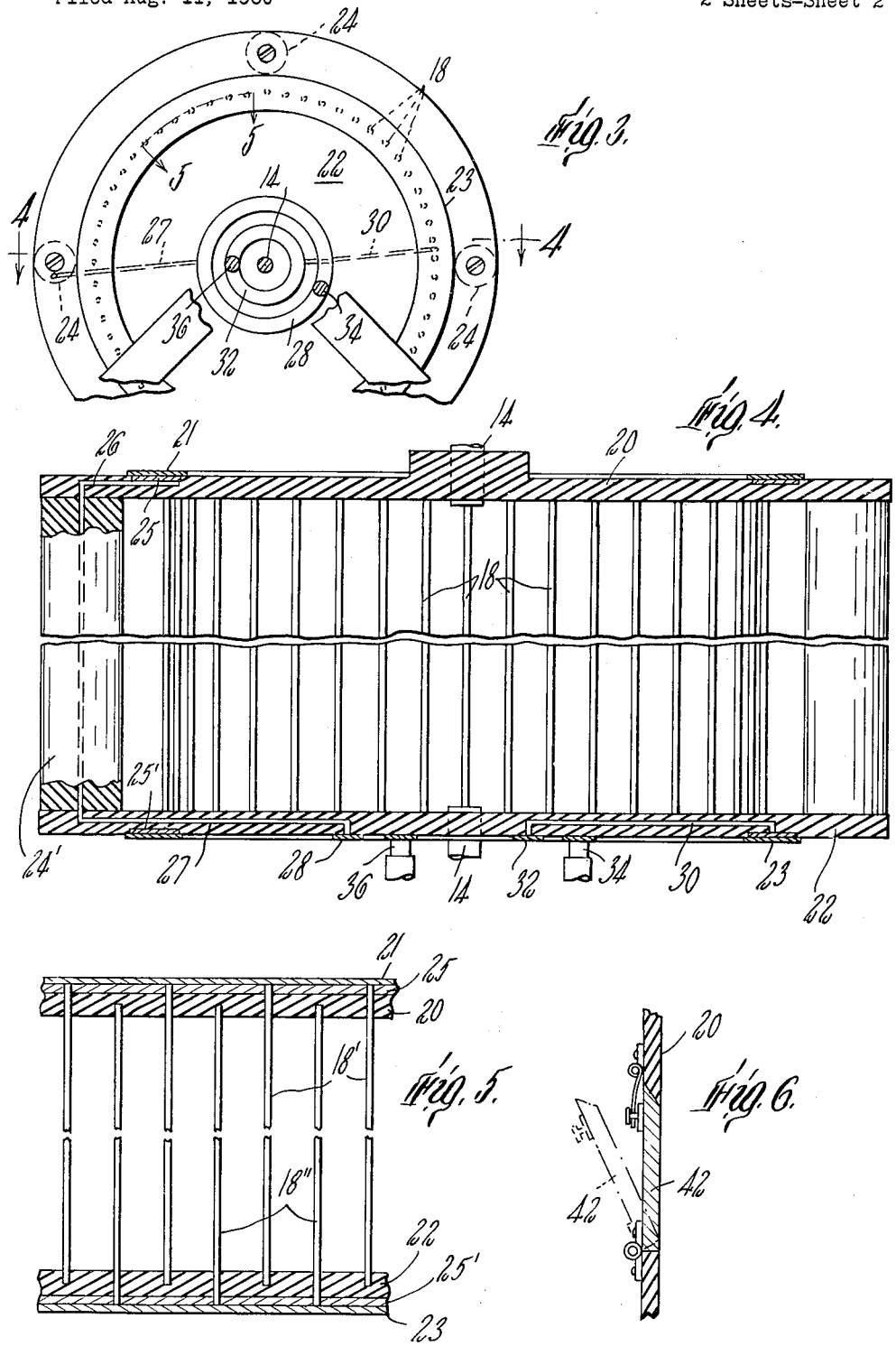

United States Patent Office 3,057,328
Patented Oct. 9, 1962

3,057,328
ELECTRICAL STIMULUS ANIMAL ACTIVITY WHEEL
Michael D. Swartz, 152 Crafts St., Newton, Mass.
Filed Aug. 11, 1960, Ser. No. 49,005
9 Claims. (Cl. 119—29)

This invention relates to observation of animal behavior and particularly to scientific evaluation of physical response of small animals such as mice. In the past there has been no generally satisfactory device for administering a sensory stimulus or a program of stimuli over an extended period to small animals in such a manner that the physical activity of the animals in response to the stimuli could be accurately determined for purposes of comparison. One of the problems is that, for a proper test, an animal must not be positively forced to move, but must be permitted to move or not to move depending on its reaction to the stimuli. The small size of the animals contributes greatly to the problems of applying a stimulus or a continued program of stimuli to the body and of accurately measuring the animal's activity.

The principal objective of this invention therefore is to provide an effective device for administering stimuli under the above conditions. The invention is a simple device by which an electrical stimulus can be easily applied to the body of a small animal while ensuring freedom of its movement. The invention comprehends an extremely efficient construction in which certain simple components perform a plurality of functions. The invention includes an adaption for recording the animal's physical movement in response to the stimulation as a numerical quantity to provide test data from each animal of a test group for comparison.

The invention is a device for scientific tests comprising a continuous animal supporting surface, adapted to rotate freely and spaced apart oppositely energized conductive elements disposed in the surface at intervals corresponding to the tread of the animal so that conductive members of different polarity can be simultaneously contacted by the animal. Thus the device provides a supporting surface which stimulates the animal and which is moved in an amount dependent upon the response characteristics of the animal. This surface movement can be easily measured. The conductive elements can also serve as part of an enclosure for the animal. Side members defining part of an enclosure can also serve to carry the electrical connections to the conductive elements. A uniquely reliable and inexpensive device is provided where the conductive elements comprise metal rods defining a cylindrical surface extending between the side members and unique circular bus members are carried one on each side member. To these bus members, corresponding ends of the metal rods are secured. Small circular slip bands are also mounted on the side members, connected to respective bus members and to energizing brushes.

While having particular usefulness in the determination of the psychological phenomenon referred to as "drive" or "motivation" (the determination of whether and to what degree a small animal would prefer to run, walk or stop when receiving unpleasant stimulation), the invention is an improved device for administering shock to animals useful for numerous purposes. The device for instance can be employed to impose upon an animal an unpleasant situation from which there is no escape for demonstrating to students the differing effects of a stress situation upon animals, and it can also be used in teaching experiments involving conditioned reflex in which for instance an animal could be required to enter the device and cause it to record a given amount of motion prior to receiving food.

Figure 2:
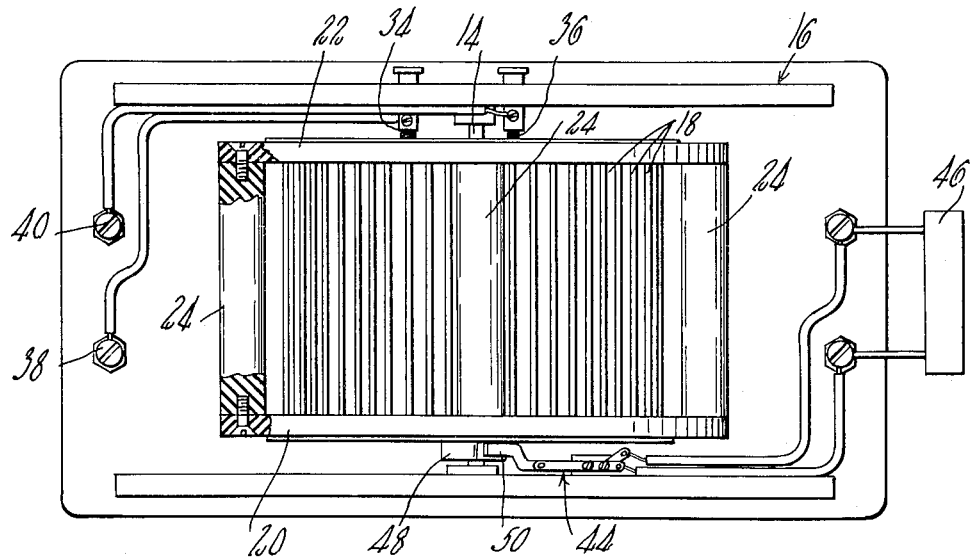

The invention will be more fully understood with reference to the following detailed description of a particularly preferred embodiment in conjunction with the accompanying drawings wherein:

FIG. 1 is a side view of the preferred embodiment in reduced scale;
FIG. 2 is a partially cut-away plan view of the device of FIG. 1;
FIG. 3 is a partially broken away side view of the device of FIG. 1 as seen from the opposite side;
FIG. 4 is an enlarged sectional view of the device taken on line 4—4 of FIG. 3;
FIG. 5 is an enlarged arcuate sectional view taken on line 5—5 of FIG. 3;
FIG. 6 is an enlarged sectional view of the door assembly taken on line 6—6 of FIG. 1.

Referring to FIGS. 1 and 2, an animal enclosing drum 12 is mounted for free rotation about a horizontal axis 14 in a stand 16. The inner generally cylindrical surface of the drum is defined by a plurality of electrically conductive wire rod members 18 extending between side members 20 and 22 formed of a suitable insulating material such as transparent plastic. Cross supports 24 impart rigidity to the drum.

Referring to FIG. 5, the particular arcuate spacing of the rod members 18 corresponds with the tread of the particular animal for which the device is adapted, a spacing of about ¼ inch being appropriate for mice. Alternate rods 18' extend through side member 20, and intervening rods 18'' extend through side member 22. A circular electrically conductive band 21 corresponding in diameter to the cylindrical surface of the drum is provided on side member 20 and serves as a bus member, being connected to corresponding ends of the rods 18' and includes solder 25 ensuring good electrical continuity. A similar band 23 is mounted on side member 22 and similarly includes solder 25' at the corresponding ends of the rods 18''.

Referring to FIG. 4, a conductive wire 26 is connected to band 21, and extends through cross support 24' to side member 22, and then has an inwardly extending portion 27 connected to a circular, conductive slip band 28 axially aligned with axis 14. A conductive wire 30 extends from band 23 inwardly to a concentric, spaced-apart circular, conductive slip band 32. The conductive elements associated with the rods 18' are electrically insulated from those of rods 18''. Brush members 34 and 36 are mounted on the stand, and slidably engage the conductive slip bands 28 and 32 respectively. Referring to FIG. 2, these brushes are connected to terminals 38 and 40 respectively, which are adapted to be energized by a suitable power source, preferably one which is of a constant voltage over the test run.

Referring to FIG. 6, a door 42 in side member 20 provides access to the inside of the drum.

Referring to FIGS. 1 and 2, a signal generator 44 is provided to generate an electrical impulse with every quarter turn of the drum, which is directed to counter 46, and thus small movements of the animal can be transduced to a meaningful signal and recorded. In this embodiment the signal generator includes a four-sided cam 48 secured in axial alignment to the drum 12. A spring cam follower 50 is mounted on the stand, positioned to engage the surface of the cam. This cam follower carries an electrical contact 52 which is caused to engage contact 54 by the corners of the cam, closing an electrical circuit and generating the desired momentary electrical impulse.

In operation the animal is introduced into the drum, and the brushes are energized, thereby creating an electrical potential drop between conductive rods 18' and 18". An electrical circuit is created from rod 18' to rod 18" through the body of the animal as it rests upon the supporting surface. This causes uncomfortable sensations, and depending upon the physical and mental characteristics of the animal, it responds by running manifesting the animal's motivation to escape from the situation. Running is, to some degree, also encouraged by the fact that the shocking effect can be somewhat lessened by the movement.

It will be seen that movement of the animal on foot, whether it be walking or running will cause reactive movement of the drum. The drum is very light weight, and by virtue of the small size of the slip bands, little frictional drag is applied, hence the supporting surface moves freely in reaction. This drum movement is easily measured and by recording the amount of movement over a given time interval, data is obtained related to the characteristics of the animal.

Depending upon the character of the test group selected, the results for each animal can be indicative of the motivation or of the sensitiveness or of the muscular response of the animal.

It will be appreciated that the particular number of shocks to be imparted to an animal can be varied by isolating by insulation selected groups of the rods from the power sources. The device can be scaled to match the size of numerous test animals.

Variations in the details of the invention can be accomplished within its spirit and scope.

What is claimed is:

1. A device for evaluating animal behavior comprising a continuous freely rotatable animal supporting surface adapted to rotate in response to animal movement, at least two spaced apart electrically conductive elements disposed in said surface at such spacing that an animal supported on said surface can simultaneously contact both, means on the device impressing an electrical potential drop across said conductive elements and means connected to the supporting surface indicating the movement of said supporting surface, whereby when the animal simultaneously contacts both of said electrically conductive elements it receives a shock and movement or absence of movement of said animal on said supporting surface in response thereto can be recorded.

2. The device of claim 1 wherein said continuously extending animal supporting surface comprises an inner cylindrical surface defined by a plurality of rod members at least two of which comprise said electrically conductive elements, said surface being disposed about a horizontal axis and adapted to rotate freely thereabout.

3. The device of claim 2 wherein the rod members are secured in cylindrical arrangement by two opposed non-conductive side members between which they extend and rod members maintained at one electrical potential extend through one of said side members into electrical contact with a bus member carried thereon, and rod members maintained at a different electrical potential extend through the second of said members into electrical contact with a second bus member carried on said second side member.

4. A device adapted for applying stimuli to an animal comprising an animal enclosure including two opposed side members and a supporting surface extending between said side members, said supporting surface having a generally cylindrical configuration mounted about a horizontal axis for free rotation, a multiplicity of spaced apart electrically conductive elements defining at least a portion of said cylindrical supporting surface, and means for creating an electrical potential between adjacent electrically conductive elements, said electrically conductive elements being spaced apart at intervals corresponding to the tread of said animal so that when said animal is supported on said surface it simultaneously can contact adjacent conductive elements and receive a shock.

5. The device of claim 4 wherein the electrically conductive elements comprise a multiplicity of metal rod members which defines said cylindrical surface.

6. The device of claim 4 wherein said means for creating an electrical potential between said adjacent electrically conductive elements includes two bus members adapted for rotation with said supporting surface, one at each end thereof, at least some spaced apart electrically conductive elements being connected to one of said bus members, and electrically conductive elements adjacent thereto being connected to the second of said bus members.

7. An animal testing device comprising a cylindrical enclosure mounted for free rotational motion about a horizontal axis, said enclosure being defined by a multiplicity of spaced apart electrically conductive rod members extending between two opposed non-conductive side members, said multiplicity of rod members comprising a plurality of pairs of rod members, both members of a pair being adapted to be contacted simultaneously by an animal in said device, two electrical bus members, one carried on one of said side members and connected to one member of each of said plurality of pairs of said electrically conductive rod members, and the second bus member carried on the second side member and connected to the second rod member of each of said pairs, and means to maintain an electrical potential drop across said bus members thereby energizing said pairs of rod members, whereby when a pair is simultaneously contacted by said animal, an electrical circuit is completed, said animal receives a shock, and its response thereto is indicated by a change in the motion state of said enclosure.

8. The testing device of claim 7 wherein said bus members are circular bands corresponding in diameter to said enclosure, one mounted on the outer surface of each of said side members in alignment with the enclosure and each of the rod members extends through the said side member upon which its corresponding bus member is mounted, and into electrical contact with said bus member.

9. The device of claim 7 in combination with a cam member mounted for rotation with said enclosure, a spring biased cam follower adapted to follow said cam, an electrical contact adapted to be closed in response to movement of said cam follower to generate an electrical pulse and said cam being shaped to cause a plurality of momentary closing movements of said contact in registry with a plurality of equal circular spacings about said enclosure, whereby an accurate electrical indication is obtained of the reaction of said enclosure in response to said animal.

References Cited in the file of this patent
UNITED STATES PATENTS

| | | |
|---|---|---|
| 528,066 | Ariens | Oct. 23, 1894 |
| 1,258,684 | Johnson | Mar. 12, 1918 |
| 1,675,972 | Cox | July 3, 1928 |
| 2,663,282 | Ingle | Dec. 22, 1953 |